July 12, 1960 L. H. MORIN 2,944,757
RIMMED PLASTIC SPOOL
Filed June 2, 1955

*INVENTOR.*
LOUIS H. MORIN
BY
*ATTORNEY*

United States Patent Office 2,944,757
Patented July 12, 1960

2,944,757
RIMMED PLASTIC SPOOL

Louis H. Morin, Bronx, N.Y., assignor to Coats & Clark Inc., New York, N.Y., a corporation of Delaware Filed June 2, 1955, Ser. No. 512,749
4 Claims. (Cl. 242—118.4)

This invention relates to spools having moulded plastic bodies, preferably formed of inexpensive plastic material, to which there are added plastic rims of a better grade of material and usually of a color contrasting to that of the color of material employed in the body of the spool.

More particularly, the invention deals with a spool structure of the character described, wherein labels, as well as label protective transparencies, can be automatically attached to the spool ends by shaping parts of the rims to retain the labels in position on the ends of the spool body.

The novel features of the invention will be best understood from the following description, when taken together with the accompanying drawing, in which certain embodiments of the invention are disclosed and, in which, the separate parts are designated by suitable reference characters in each of the views and, in which.

This application is a continuation-in-part of my prior application, Serial Number 442,140, filed July 8, 1954.

In the production of moulded plastic spools, it has been the practice to mould the entire spool structure from a single plastic material and this material, in many instances, has been of a color to match or harmonize with the color of thread arranged upon the spool. Spool bodies made in this manner have been formed from plastic material which is rather expensive and I have found a method of utilizing in the main body portion of the spool an inexpensive plastic material, which can be of any desired color and to so shape this inexpensive body as to receive a second moulded rim of a more expensive material and one having a color usually contrasting to that of the body and suitable for use with the thread mounted upon the spool.

With this method of procedure, the cast-on rim can be fashioned with an integral part which can be formed or spun-over to engage a label, or a label including a transparent covering therefor. By the method of procedure, greater economy results in the production of the end product.

Figure 1:
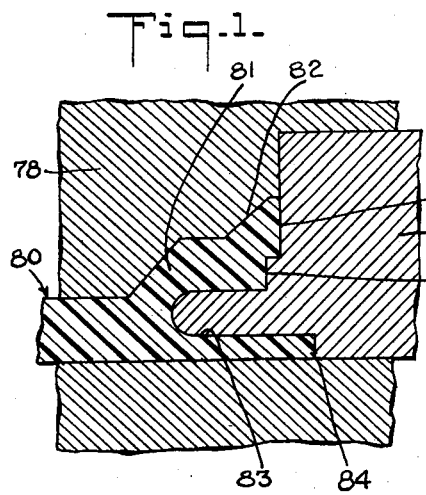
Fig. 1 is a detailed sectional view showing the moulding of a form of spool body.

In Fig. 1, I have shown, in part, a pair of dies 78, 79 for moulding spool body 80, the spool body having an enlarged flared end 81 having, at its periphery, an annular recess 82. The outer surface of the spool body has an annular deep slot 83, the outer end 84 of the inner wall of which protrudes beyond the end surface 85 of the enlargement 81. The surface 85 has an annular undercut ridge 86, which opens into the annular slot 83.

Figure 5:
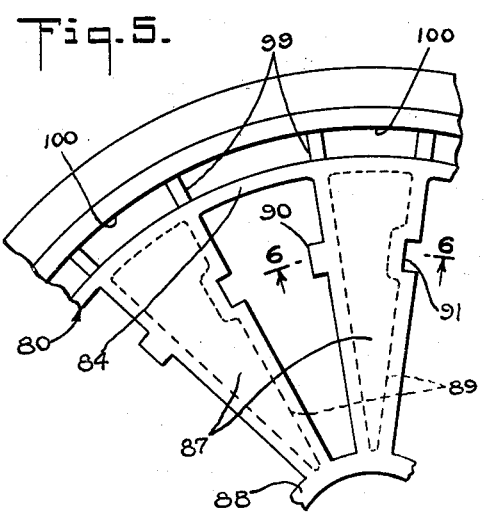
Fig. 5 is a partial end view of the spool assemblage, as noted in Fig. 2, in other words, before attachment of a label.
Figure 6:
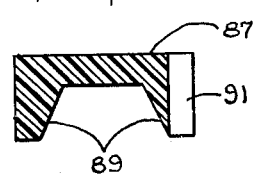
Fig. 6 is an enlarged section through one of the end ribs of the spool, the section being on the line 6—6 of Fig. 5.

Considering Figs. 5 and 6 of the drawing, it will be apparent that the spool body 80 includes, at its end, circumferentially spaced spokes 87, which extend from the wall end 84 inwardly to the hub portion 88 of the resulting spool body. Considering Fig. 6, which shows a section of one of the spokes 87, it will appear that the spokes include, at their side edges, inwardly projecting reinforcing ribs 89. It will also appear that opposed sides of each spoke have, at predetermined portions, projections 90 and recesses 91.

Figure 2:
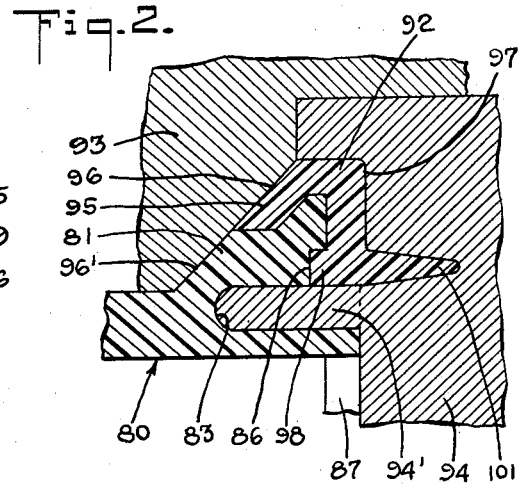
Fig. 2 is a view similar to Fig. 1, illustrating the moulding of a rim on the spool body shown in Fig. 1.

In completing the formation of the resulting spool, a ring or rim 92 is moulded upon the enlarged and flared end 81 of the spool body and, in Fig. 2, I have indicated, in part, two dies 93 and 94 for moulding the rim 92 on the spool body. The rim 92 includes an anchor portion 95 extending into the recess 82, the anchor portion 95 having a bevelled surface 96 which registers with and is continuous with a corresponding bevelled surface 96' on the flared end 81.

Figure 4:
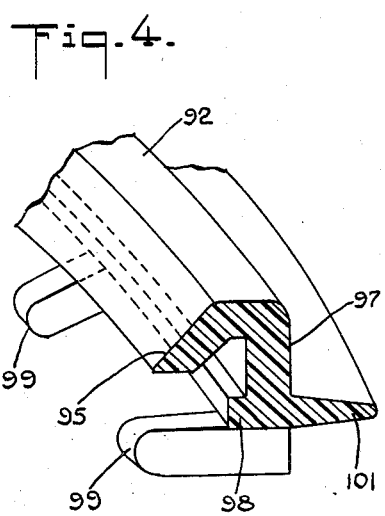
Fig. 4 is a partial perspective and sectional view of the ring shown in Figs. 2 and 3, detached.

The rim 92 includes an outer surface portion 97 which overlies the surface 85 and includes a key portion 98, which extends into the undercut ridge 86, as clearly noted. On the inner surface of the rim 92 are circumferentially spaced ribs 99, note Figs. 4 and 5, which extend into the slots 83 and serve to reinforce the flared end 81, as well as the rim 92. The die 94 includes core portions 94', note Fig. 2, which extend into the recess 83, thus leaving the circumferentially spaced, long apertures 100 in the resulting spool assemblage, as noted in Fig. 5 of the drawing.

The rim 92 also includes an outwardly extending integral annular label engaging member or flange 101 which is originally moulded in the position indicated in Fig. 2 of the drawing and is later spun-over, as noted in Fig. 3, to engage the outer peripheral portion of a label 102 which is supported upon outer surfaces of the spokes 87, hub 88 and ribs 99.

Figure 3:
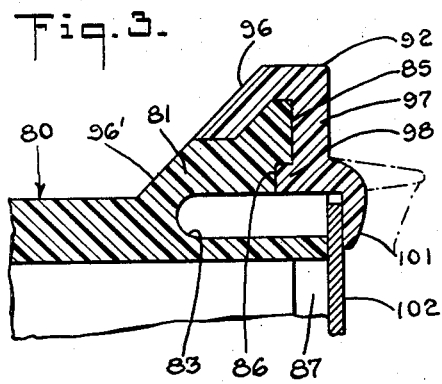
Fig. 3 is a sectional detailed view, illustrating the attachment of a label to the spool assemblage, as shown in Fig. 2.

An advantage of the construction of Fig. 3 is that the plastic rim 92 is prevented from breaking apart and falling off the spool body. This may be explained in the following way. During injection of casting material from the injection nozzle to the die cavity, the casting material is in a molten state, and it is sometimes possible, as where a casting in the form of a ring member such as rim 92 is formed, that an unsound casting may be produced, particularly at a portion of the ring which is located opposite to the casting material inlet. The unsoundness or defect may be manifested by the fact that the ring member is incompletely formed, or weakened, at the portion in question. Various reasons may be responsible for the defect, such as a slight drop in temperature or pressure at the portion in question, but in any event the defect is usually difficult to detect even by examining it under powerful magnification. But if the defect is subjected to a strain, the ring member may give at the point of the defect, if the strain is severe enough, and the member may ultimately break apart and circumferentially expand. For example, if the rim 92, during the step of nicking the spool to provide a thread-holding nick, is accidentally nicked too heavily at a point where a defect is present, the strain induced by the nicking may cause the rim to give or to loosen its grip or contact with the spool body and may further cause the rim to break apart, forming two separated ends that tend to spread away from each other resulting in the rim falling off the spool body. Such breaking or spreading apart of the rim is prevented by providing the annular, inwardly extending projection or key portion 98 on the rim and the annular recess 86 in the end surface 85 of the spool body. As is apparent, the annular projection 98, which is concentric with and of smaller diameter than the outer peripheral portion of rim 92, by its engagement with the undercut ridge or annular recess 86, mechanically prevents rim 92 from spreading apart. The construction of Fig. 3 is not limited to rims having a label-engaging flange, such as flange 101, but is applicable to spools wherein the label is secured to the spools by the casting on of the rim.

In connection with the steps of forming the spool of Fig. 3, as illustrated in Figs. 1 and 2, it is apparent that the core portions 94' of the die 94 act as supports for the end portion 81 of the spool body during the casting of the rim 92. By means of this procedure, casting material, even though under high injection pressure, is prevented from leaking out of the die cavity, particularly at a point like the junction between the bevelled surfaces 96 and 96', and forming undesirable flash.

In Fig. 5 it is apparent that the ribs 89 act to stiffen the spokes 87. These ribs extend without a break throughout the full length of each side of each spoke, and as shown in Fig. 5, each rib 89 is alined with a rib 99. The spool is thus substantially reinforced at each end while yet affording economy of plastic material by means of the weight-reducing apertures 100. Economy of plastic is also provided by the spaces between spokes 87 and by the generally hollow interior construction of the spool, as described in copending applications Serial Nos. 363,294, filed June 22, 1953, now abandoned, note Figs. 13–14b, and 486,664, filed February 7, 1955, note Figs. 1–3.

From the foregoing it will be apparent that moulded rims of different characteristics from the rest of the spool may be formed upon a premoulded plastic spool body of any desired construction. The rims may be provided with means for holding labels in contact with the spool ends, without using cement or adhesive, and the labels may be mounted in place following the casting on of the rims. The appearance of the spool is thus improved and its cost reduced. The rimmed end portions of the spool have adequate strength and stability to withstand the handling to which spools are subjected and, further, facilitate the formation of thread-holding nicks which, by virtue of the strength and resiliency of the plastic rims, are resistant to breaking away.

To further reduce the weight of the spools and economize plastic, the spool bodies may be formed of so-called foamed plastic material, as taught in copending application Serial Number 456,239, filed September 15, 1954, now United States Patent No. 2,829,400.

Having fully described my invention, what I claim as new and desire to secure by Letters Patent is:

1. A plastic spool comprising a plastic spool body having enlarged rim end portions and a cast-on plastic rim arranged upon each of said enlarged rim end portions, interengaging circumferentially extending means on said enlarged rim end portions and said rims for retaining the rims against displacement from the spool body, said interengaging means comprising an annular undercut ridge on each enlarged rim end portion, a key portion on each of said rims engaging said ridges, the spool body, inwardly of said annular ridges, having deep annular slots, and each rim having circumferentially spaced ribs extending into said slots.

2. A plastic spool comprising a plastic spool body having enlarged rim end portions and a cast-on plastic rim arranged upon each of said enlarged rim end portions, interengaging circumferentially extending means on said enlarged rim end portions and said rims for retaining the rims against displacement from the spool body, said interengaging means comprising an annular undercut ridge on each enlarged rim end portion, a key portion on each of said rims engaging said ridges, the spool body, inwardly of said annular ridges, having deep annular slots, each rim having circumferentially spaced ribs extending into said slots, and the rims having integral means for engaging labels disposed upon end surfaces of the spool body.

3. A light weight, plastic thread spool for household use comprising a preformed plastic spool body having enlarged, but incomplete, rim end portions, each said end portion when viewed in section having on one side thereof a circumferentially extending bevelled surface and, on the opposite side, forming a partial end face of the spool; said spool body also comprising a substantially hollow barrel intermediate said end portions and defined by circumferentially extending walls that connect said end portions, and an inner tube concentric with said barrel and having a hub portion terminating in each said end face; a cast-on, annular plastic rim on each end portion which completes said end portion to form a finished rimmed end on the spool, said rim having on one side thereof a bevelled portion alined with said bevelled surface and on the opposite side a centrally apertured end wall that forms a peripheral portion of said end face, said apertured end wall extending radially inwardly of said end face for a portion of the distance between the periphery of the end face and the inner surface of said barrel wall, the aperture in said end wall having a diameter greater than the inside diameter of the barrel; said rim when viewed in section being of non-uniform thickness; said rim and rim end portion having interlocking means for preventing pull-apart separation of the rim in a longitudinal direction relatively to the spool; said rim and rim end portion having interengaging means, independent of said interlocking means, for preventing displacement of the rim in a radially outward direction, said interengaging means comprising an annular recess in said partial end face and an annular projection on said apertured end wall of said rim, said projection and recess being interfitting and each having a diameter smaller than the largest diameter of said rim; said rim end portion having a series of weight-reducing, circumferentially spaced slots which open through said end face and which are disposed radially inwardly of said interengaging means, an annular wall portion located radially inwardly of said slots and serving to partly define the latter, said rim having circumferentially spaced, longitudinally disposed ribs extending into said slots to reinforce said rim end portion; each said end face of the spool being also formed by a plurality of circumferentially spaced spokes joining said annular wall portion to said hub portion, each spoke having on each lateral edge thereof a stiffening rib which extends continuously from said hub portion to said annular wall portion and which is alined with one of said longitudinal ribs on said rim; a label on each end face of the spool, said label being of smaller diameter than the largest diameter of said rim so that said apertured end wall of the rim is exposed to view, thereby imparting a decorative appearance to the spool, said apertured end wall of the rim having an integral, annular flange portion engaging a peripheral portion of the label and holding the label against said end face; and said spool body and rims each being entirely composed of plastic with said spool body being of lower quality, less expensive plastic than the rims.

4. A light weight, plastic thread spool for household use comprising a preformed plastic spool body having enlarged, but incomplete, rim end portions, each said end portion when viewed in section having on one side thereof a circumferentially extending bevelled surface and, on the opposite side, forming a partial end face of the spool; said spool body also comprising a substantially hollow barrel intermediate said end portions and defined by circumferentially extending walls that connect said end portions, and an inner tube concentric with said barrel and having a hub portion terminating in each said end face; a cast-on, annular plastic rim on each end portion which completes said end portion to form a finished rimmed end on the spool, said rim having on one side thereof a bevelled portion alined with said bevelled surface and on the opposite side a centrally apertured end wall that forms a peripheral portion of said end face, the aperture in said end wall having a diameter greater than the inside diameter of the barrel; said rim and rim end portion having interlocking means for preventing pull-apart separation of the rim in a longitudinal direction relative to the spool; said rim and rim end portion having interengaging means, independent of said interlocking means, for preventing displacement of the rim in a radially outward direction; said rim end portion having a series of weight-reducing, end-opening, circumferentially spaced slots which are disposed radially inwardly of said interengaging means, said rim having longitudinally disposed ribs extending into said slots to reinforce said rim end portion; each said end face of the spool having a plurality of end wall portions joining said rim end portion to said hub portion, each end wall portion having on each lateral edge thereof a continuous stiffening rib which is alined with one of said longitudinal ribs on said rim; a label on each end face of the spool, said label being of smaller diameter than the largest diameter of said rim so that said apertured end wall of the rim is exposed to view, thereby imparting a decorative appearance to the spool, said apertured end wall of the rim having an integral, annular flange portion engaging a peripheral portion of the label and holding the label against said end face; and said spool body and rims each being entirely composed of plastic with said spool body being of lower quality, less expensive plastic than the rims.

References Cited in the file of this patent

UNITED STATES PATENTS

| | | |
|---|---|---|
| 368,675 | Leonard | Aug. 23, 1887 |
| 956,485 | Conklin | Apr. 26, 1910 |
| 1,028,877 | Herrick | June 11, 1912 |
| 1,140,868 | Bennett | May 25, 1915 |
| 1,589,177 | Kendall | June 15, 1926 |
| 1,958,840 | Baker | May 15, 1934 |
| 1,970,506 | Womeldorff | Aug. 14, 1934 |
| 2,000,372 | Beck | May 7, 1935 |
| 2,431,238 | Friedman | Nov. 18, 1947 |
| 2,657,876 | Bieber | Nov. 3, 1953 |
| 2,683,572 | Morin | July 13, 1954 |
| 2,689,096 | Morin | Sept. 14, 1954 |
| 2,750,129 | Morin | June 12, 1956 |
| 2,773,657 | Morin | Dec. 11, 1956 |
| 2,774,398 | Morin | Dec. 18, 1956 |
| 2,775,418 | Cadman | Dec. 25, 1956 |

FOREIGN PATENTS

| | | |
|---|---|---|
| 2,079 | Great Britain | 1854 |
| 2,104 | Great Britain | Sept. 15, 1859 |
| 3,857 | Great Britain | 1878 |
| 226,683 | Great Britain | Jan. 1, 1925 |
| 602,175 | Great Britain | May 21, 1948 |
| 265,489 | Switzerland | Sept. 16, 1950 |
| 690,147 | France | June 10, 1930 |